(12) United States Patent
Regimbal et al.

(10) Patent No.: US 6,563,524 B1
(45) Date of Patent: May 13, 2003

(54) USER-DEFINED LOCALLY OPTIMIZED COLOR PLANE REGISTRATION

(75) Inventors: Laurent A. Regimbal, Round Rock, TX (US); David E. Smith, Emmett, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 28 days.

(21) Appl. No.: 10/012,469

(22) Filed: Dec. 12, 2001

(51) Int. Cl.[7] .................. G03G 15/00; B41J 2/385; G01D 15/06

(52) U.S. Cl. ............... 347/116; 399/15; 399/49; 399/72; 399/81

(58) Field of Search .............. 399/49, 72, 301, 399/81, 15; 347/116

(56) References Cited

U.S. PATENT DOCUMENTS 5,060,013 A * 10/1991 Spence ................ 399/72
5,884,118 A * 3/1999 Mestha et al. ........... 399/72
6,519,425 B2 * 2/2003 Fischer ................ 399/49

FOREIGN PATENT DOCUMENTS

JP        11-320976        * 11/1999

* cited by examiner

Primary Examiner—Susan S. Y. Lee

(57) ABSTRACT

Methods and apparatus in accordance with the instant invention include device for focusing color plane registration of an imaging device in a localized zone, or area, of a printed page. The localized zone is selected by the user to correspond to the location of at least a portion of an image that requires high-definition image quality. The instant invention discloses apparatus having this capability as well as methods for accomplishing this result, including methods for identifying the localized zone.

20 Claims, 5 Drawing Sheets

USER-DEFINED LOCALLY OPTIMIZED COLOR PLANE REGISTRATION

FIELD OF THE INVENTION

The invention claimed and disclosed herein pertains to imaging devices and more particularly, to optimizing color plane registration for imaging devices.

BACKGROUND OF THE INVENTION

Various types of imaging devices are known in the art. The term "imaging device" as used herein refers to any device that is configured to produce a visual image on an image media. Imaging devices include devices commonly known as printers, copiers, facsimile machines, and the like. Image media includes paper and plastic sheet material. Generally, imaging devices employ various techniques to deposit ink or powdered toner onto an image media to produce an image-product. The term "image-product" as used herein denotes a piece of image media that bears at least one image thereon.

Imaging devices that are configured to produce multi-colored images are also known in the art. The term "multi-colored image" means an image that comprises more than one color, wherein one of the "colors" can be black. Various types of printed graphics as well as photo-quality images can be produced on prior art imaging devices. Such prior art imaging devices are also generally capable of producing monochromatic images. For example, many prior art imaging devices, in addition to having the capability to produce multi-colored images, are also capable of producing images in the form of monochromatic text comprising black alpha-numeric characters on white image media.

Of the various types of prior art imaging devices in use, one of the more popular types is that commonly known as the "laser printer." It is understood that the "laser printer" is used for most types of image devices including copiers and facsimile machines in addition to printers. Thus, the term "laser printer" is generally used within the art to denote any imaging device that employs the laser scanning process for producing image-products. Laser printers are available with multi-color capability, although many laser printers have only monochromatic capability.

Laser printers having multi-color capability generally employ four "colors" of toner to produce images that can comprise a substantially full color gamut. Such imaging devices are often referred to as "four-color laser printers." The four colors of toner generally utilized are those of black, cyan, magenta, and yellow. Known techniques of applying various combinations of the four different toners can yield a wide array of colors in an image-product.

Laser scanning imaging devices ("laser printers") generally employ at least one beam of light which is commonly a laser beam. The beam is scanned laterally across a moving, electrostatically charged, photosensitive surface in order to "expose" selected portions of the surface in accordance with a particular image to be produced. That is, the beam generally scans a latent image-into the photo-sensitive surface, wherein the latent image is characterized by a difference in electrical potential relative to portions of the surface that do not form the image. Powdered toner is then applied to the latent image which results in an image formed from toner. That is, the toner is attracted to the latent image and is not attracted to portions of the photo-sensitive surface that are not part of the latent image. The toner image is then ultimately transferred to an image media such as a sheet of paper or the like.

In a four-color laser printing process, the above-described process of forming an image from toner is performed separately for each of the colors of toner used to thereby produce the overall image. Each of these images comprising a single toner is referred to as a "color plane." The overall image comprises all of the color planes together (i.e., all of the color planes used for the overall image, which can be one, two, three or four of the colors). Generally, each of the color planes is formed separately in this manner and then all the color planes are brought together to form the overall image. There are several known methods of forming the color planes to make up an overall image. Two of these methods are known respectively as "single-pass" and "four-pass" color imaging.

Turning now to FIG. 1, a side-elevation schematic diagram is shown which depicts some of the major components of a typical prior art single-pass, four-color laser imaging device ("printer") 10. As is seen, the prior art printer 10 comprises a plurality of electro-statically chargeable photo-sensitive surfaces ("photoconductors") 11 that are substantially in the form of cylindrical drums. Each of the photo-conductors 11 is configured to rotate in a process direction indicated by the respective arrow, as marked. The prior art printer 10 also comprises a plurality of laser devices 13. Each one of the laser devices 13 corresponds to a respective photoconductor 11 as shown. Further, each of the laser devices 13 is configured to generate a laser beam "LB." The laser beam "LB" is selectively pulsed and is laterally scanned across the respective photoconductor 11 in a scan direction (not shown) as the photoconductor rotates. The scan direction is generally substantially perpendicular to the process direction. As a result of the scanning laser, the respective latent color plane is generated on the surface of each photoconductor 11, as explained above.

In addition to the laser devices 13, several toner hoppers 15 are included in the prior art printer 10. As is seen, each one of the toner hoppers 15 corresponds to a respective photoconductor 11. Each of the toner hoppers 15 are configured to deposit, on the respective photoconductor 11, one of the toners of which there are four colors as explained above. Thus, each of the four color planes which can make up a given image is produced on a respective photoconductor 11 by way of the corresponding laser device 13 and toner hopper 15.

The prior art printer 10 typically also includes a controller 20 as shown. The controller 20 is generally linked in signal communication with each of the laser devices 11. The controller 20 can be linked with other components of the printer 10 as well. The controller 20 is configured to control the selective pulsing and scanning of the laser devices 11 so as to generate the latent color plane on each respective photoconductor. The controller 20 can also be configured to control various other operational aspects of the printer 10 as will be explained below. The prior art printer 10 can comprise a sensor 21 which is linked in signal communication with the controller 20. The operation of the sensor 21 will be explained below.

As revealed in FIG. 1, a print path "PP" is defined by the printer 10. The print path "PP" is generally defined by various media-handling components such as feed rollers (not shown), media guides (not shown), and the like. The print path "PP" is configured to convey there along an image media "M," such as a sheet of paper, in the direction indicated by the arrow 30. As the media "M" is conveyed along the print path "PP," each of the color planes that are to be produced on the respective photoconductors 11 is successively transferred there from, one on top of the other, to the media "M." Thus, by the time the media "M" passes the sensor 21, all of the color planes have been generated and transferred to the media, to form the overall image thereon. It should be observed that an overall image does not need to be formed from all of the available colors, and can be formed from individual colors or any combination thereof.

Because all four of the color planes together can form the overall image, the quality of the overall image is dependent upon the alignment of each of the color planes relative to one another. That is, in order to produce a perfect overall image, the four color planes are preferably superimposed upon one another in perfect alignment as defined by the alignment of colors in the image source (i.e., a data file representative of the image, or an original document which is optically scanned to read an image thereon). An image having misaligned color planes can appear to lack sufficient sharpness and clarity and/or can appear somewhat disjointed. The concept of alignment of the color planes which make up an image is known as "color plane registration" (CPR). The color plane registration of a given image can depend upon many factors. Among these factors are the timing and coordination of each of the laser devices 13 as well as the timing and coordination of each of the photoconductors 11.

Generally, the timing and coordination of the laser devices 13 and photoconductors 11 can be controlled by way of the controller 20 and the sensor 21. As mentioned above, the sensor 21 is linked in signal communication with the controller 20. The sensor is configured to detect irregular color plane registration and to notify the controller 20 of such irregularities. The controller 20 can then make corrective adjustments as required with respect to the control of the laser devices 13 and photoconductors 11. This process is preferably performed using a predefined calibration image which can be stored as a digital data file in the imaging device and retrieved to generate a printed calibration image. The resultant printed calibration image can then be compared against the calibration image data file using sensors, and any differences between the printed image and the calibration file can be detected. The imaging device can then be adjusted so that the printed calibration image more closely resembles the calibration ideal image as represented by the calibration data file.

For example, the printer 10 can be configured to periodically print a test calibration image (not shown). When the test calibration image is printed, the sensor 21 can detect any irregularities in the color plane registration of the calibration image. The sensor 21 then sends a signal to the controller 20, wherein the signal contains data indicative of the nature and extent of the irregularities, for example. The controller 20 can then receive the signal and evaluate the data to determine what corrective adjustments are needed to optimize the color plane registration.

Examples of such adjustments can include, by way of example only, alignment of the lasers or the laser beams using adjustable optics, timing of the lasers (both rate of scan and time to begin initial scan), the rotational speed of the photoconductor on which a single color image is scanned by the laser, the physical alignment of the photoconductors with respect to one another, and with respect to a media path or an intermediate transfer medium disposed between the photoconductors and the media, and the rate of travel of any such intermediate transfer medium. Methods and apparatus for adjusting each of these parameters, as well as other parameters which can affect color plane registration, are well known in the art.

However, several causes of irregular color plane registration exist which cannot be totally corrected by way of the procedure explained above. For example, differences in the size and shape of the photoconductors 11 relative to one another can cause uncorrectable irregularities in color plane registration. Such differences in the size and shape of the photoconductors 11 are most often caused by standard manufacturing tolerances and the like. That is, the photoconductors 11 can be economically manufactured only to within given dimensional tolerances. This, in turn, inevitably results in slight variations in size and shape of the photoconductors 11 relative to one another. As a result, slight variations in alignment between the respective color planes can occur as the color planes are transferred from the photoconductors 11 to the media "M."

The controller 20, along with the sensor 21, can compensate for such irregularities in color plane registration which are caused by manufacturing tolerances and the like. However, these irregularities cannot be totally eliminated from the final image-product by the compensation process described above with respect to the controller 20 and the sensor 21. A typical prior art remedy for the irregularities in color plane registration which result from manufacturing tolerances and the like is to minimize the irregularities as an average over the entire sheet of media "M." That is, prior art printers 10 are typically configured to detect color plane registration irregularities by way of the sensor 21, for example, and then compute a corrective adjustment solution which will result in an average optimization of the image over substantially the entire page with respect to the color plane registration.

The means of compensating for color plane registration irregularities and for creating an average solution over the entire page is well understood in the art. Such means can include adjusting the timing, movement, alignment, and the like, of the laser devices 13 as well as of the photoconductors 11, as explained above. Because the prior art solution for dealing with irregularities in color plane registration results in only an average solution, prior art printers 10 can prove unsatisfactory for users who require a sharp, clear multicolor image in a predetermined region of the sheet of media "M." Furthermore, the sensor 21 is typically configured to detect color plane registration irregularities on only a portion of the sheet of media "M." For example, prior art printers 10 typically include sensors 21 that are configured to monitor only an edge of the image area of a sheet of media "M." Alternatively, the prior art sensor 21 is configured to monitor only the center of the sheet of media "M." Thus, the prior art provides limited means of correcting for irregularities in color plane registration, which means can prove unsatisfactory for many uses of the prior art printer 10. What is needed then are means for optimizing color plane registration in accordance with user demands, wherein such means achieve the benefits to be derived from similar prior art means, but which avoid the shortcomings and detriments individually associated therewith.

SUMMARY OF THE INVENTION

In accordance with one embodiment of the instant invention, a method of optimizing color plane registration includes focusing the color plane registration on a high-value zone. A high-value zone is an area of an image-page which contains at least a portion of a multicolor image for which image sharpness and clarity, and thus optimized color plane registration, is important. Thus, focusing the color plane registration means optimizing the color plane registration in a given region, or area, of a page of media, wherein the given region or area contains an image or a portion of an image for which optimization of color plane registration is desired. In accordance with another embodiment of the instant invention, a method of optimizing color plane registration includes minimizing color plane misalignment in a high value zone, wherein the high value zone can be defined by a user.

In accordance with yet another embodiment of the instant invention, a method of producing an image includes producing an image-page that has at least one multicolor image. The image-page (i.e., a sheet of media and including at least one image printed thereon) is displayed as well, which can include printing the image-page on a sheet of media, or displaying the image-page on a display screen such as a monitor or the like. A plurality of zones are defined on the image-page in order to assist in identifying the location of the high-value zone relative to the image-page. That is, a high-value zone is identified, wherein the color plane registration is to be optimized. That is, the color plane registration can then be optimized for the high-value zone by ensuring that color plane misalignment is minimized therein.

In accordance with still another embodiment of the instant invention, an imaging apparatus includes a print path that is configured to convey a sheet of media. A plurality of photoconductors is oriented relative to the print path so that each of the photoconductors can successively and ultimately deposit a respective color plane onto the sheet of media as the media moves along the print path and past the photoconductors. The color planes together with the sheet of media combine to form an image-product. At least one laser device is included in the apparatus. Each laser device can generate a latent color plane on a respective corresponding photoconductor. A controller is linked in signal communication with each of the laser devices and is configured to cause the laser devices to focus the color plane registration within the high-value zone.

These and other aspects and embodiments of the present invention will now be described in detail with reference to the accompanying drawings, wherein:

DETAILED DESCRIPTION OF THE INVENTION

The instant invention generally includes methods and apparatus for optimizing color plane registration in multicolor imaging devices so as to allow a user of the device to focus the color plane registration in a localized area, or high-value zone, of an image-page so as to produce a high-quality image within the localized area. This feature of the instant invention differs from the prior art in that prior art methods and apparatus generally average the inherent misalignment of the color planes over substantially the entire image-product. A "high-quality" image, as the term is used herein, is at least a portion of a multicolor image for which portion visual sharpness and clarity, and thus optimal color plane registration, is important. The term "focus" as used herein means to cause relevant components of an imaging device to substantially align a plurality of color planes within a given region, or high-value zone, of an image-product. A "high-value zone" means a selected zone of an image-product in which zone the color plane registration is to be optimized. The high-value zone can be specified by the user so as to correspond with the location of a high-quality image. An "image-product" is a sheet of media having at least one high-quality image thereon. The majority of the inherent misalignment of the color planes, which is due to manufacturing tolerances and the like as explained above with respect to the prior art, is thus distributed over the portions of the image-product which lie outside of the high-value zone. In this manner, the inherent misalignment of the color planes is selectively shifted to portions of the image-product, such as those regions bearing monochromatic text for example, for which color plane registration is irrelevant or of lesser importance. At the same time, the color plane registration can be optimized within the given selected region because optimization of color plane registration has been effectively sacrificed in the other regions. Such focusing of the color plane registration within a given region in accordance with the instant invention allows the high-quality image to be produced with exceptional crispness and clarity.

Figure 1:
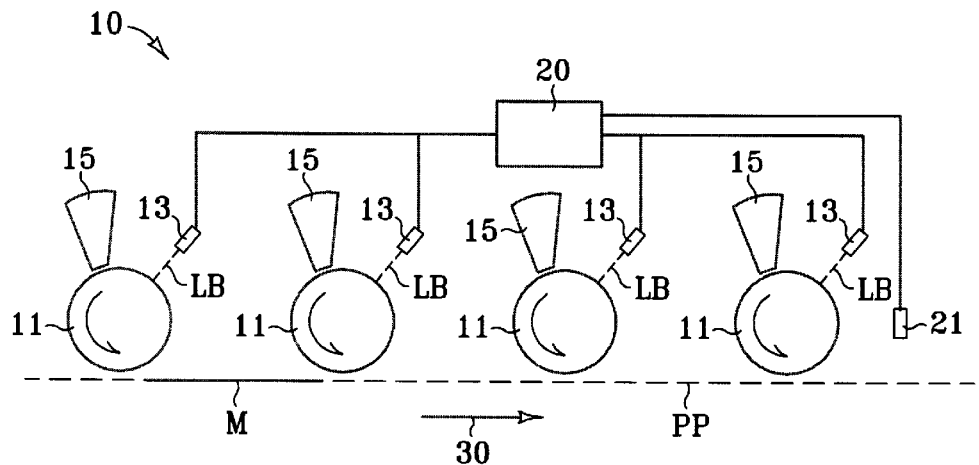
FIG. 1 is a side-elevation schematic diagram which depicts a prior art imaging device.
Figure 2:
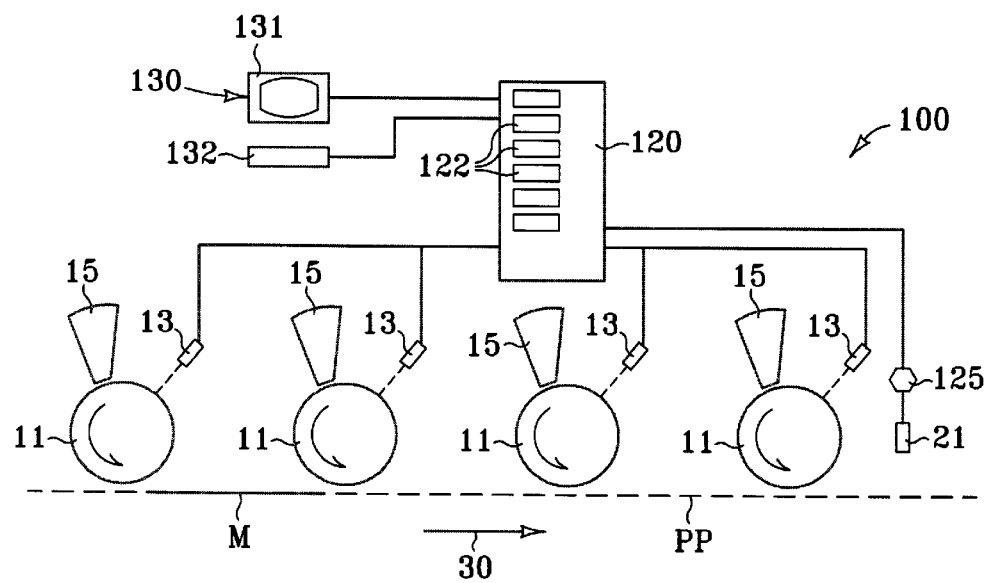
FIG. 2 is a side-elevation schematic diagram which depicts an imaging apparatus in accordance with one embodiment of the instant invention.

Non-limiting examples of the instant invention will now be described with respect to the accompanying drawings. Turning now to FIG. 2, a side-elevation schematic diagram is shown which depicts an apparatus 100 in accordance with one embodiment of the instant invention. As is seen, the apparatus 100 is configured as an imaging device, and can be configured in a manner similar to that of the prior art imaging device 10 which is described above with respect to FIG. 1. Specifically, as shown in FIG. 2, the apparatus 100 is configured as a single-pass, four-color laser printer.

However, it is understood that various apparatus in accordance with other embodiments of the instant invention, which are not shown, can be configured in alternative manners. For example, another apparatus in accordance with an alternative embodiment of the instant invention can be configured in the manner of a four-pass, four-color laser printer, or an "n"-color laser printer, wherein "n" is 2 or more. As yet another example, an apparatus in accordance with the instant invention can comprise an intermediate transfer device. Intermediate transfer devices are well-known in the art.

It is understood that other configurations of imaging apparatus can be used in accordance with the instant invention. In other words, it is understood that the novel aspects of the instant invention can be applied to various types and configurations of imaging devices as will become apparent in later discussion. Thus, the specific embodiment exemplified by the apparatus 100 shown and described herein is intended to illustrate but one of a number of possible configurations of imaging apparatus in conjunction with which the novel aspects of the instant invention can be employed. That is, it is understood that, while the instant invention is described for illustrative purposes herein with respect to a specific configuration of an imaging device, the instant invention can be applied with similar effect to imaging means, apparatus, and methods other than those which are specifically described herein.

The apparatus 100 comprises at least one photoconductor 11 as shown. The apparatus 100 can also comprise at least one laser device 13, and a plurality of hopper devices 15. The photoconductors 11, laser devices 13, and hopper devices 15 have each been described above with respect to the prior art. However, as used herein, the term "laser device" is intended to include any device that is configured to create a latent image or color plane on a photoconductor. Thus, the term "laser device" can include devices that do not actually comprise lasers nor create a laser beam. For example, a light-emitting diode ("LED") can be employed to create a latent image or color plane on a photoconductor and thus, can be included within the meaning of "laser device" as used herein.

The apparatus 100 preferably includes a print path "PP" that is defined by various media-handling components (not shown) as described above with respect to the prior art. The print path "PP" is configured to convey a sheet of media "M", in the direction 30 as is also described above with respect to the prior art. As mentioned above, an imaging apparatus in accordance with the instant invention can alternatively comprise an intermediate transfer device (not shown) positioned substantially between the photoconductors 11 and the print path "PP," wherein an image is first deposited on the intermediate transfer device before being transferred to a sheet of media "M" on the print path.

A controller 120 is also preferably included in the apparatus 100. The controller is linked in signal communication to at least one of the aforementioned components, such as the laser devices 13 as shown. The controller 120 is preferably configured to control the laser devices 13 as well as other components, such as the photoconductors 11, in manners similar to those which are described above with respect to the prior art. That is, the apparatus 100 is preferably configured to produce an image on a sheet of media "M" in the manner described above with respect to the prior art.

The controller 120 is preferably configured to execute a sequence of computer-executable steps 122 which will be described in greater detail below. The computer-executable steps can be contained in a computer-readable memory device (not shown) which is accessible by the controller 120. The apparatus 100 also comprises at least one sensor 21 which is linked in signal communication to the controller 120 and which has been described above with respect to the prior art. That is, the apparatus 100 can comprise a single sensor 21, or in the alternative, can comprise a plurality of sensors as will be discussed below. The apparatus can comprise a positioning device 125 which is configured to laterally reposition the sensor 21 as directed by the controller 120 and as described in greater detail below.

As is also seen, the apparatus 100 preferably comprises an interface device 130 which is linked in signal communication to the controller 120 and which is configured to allow a user of the apparatus to exchange data with the controller. For example, the interface device 130 can comprise a display screen 131 or the like which is configured to communicate data from the controller 120 to the user of the apparatus 100. Moreover, for example, the interface device 130 can comprise a keypad 132 or the like which is configured to allow the user to communicate data to the controller 120.

Figure 3:
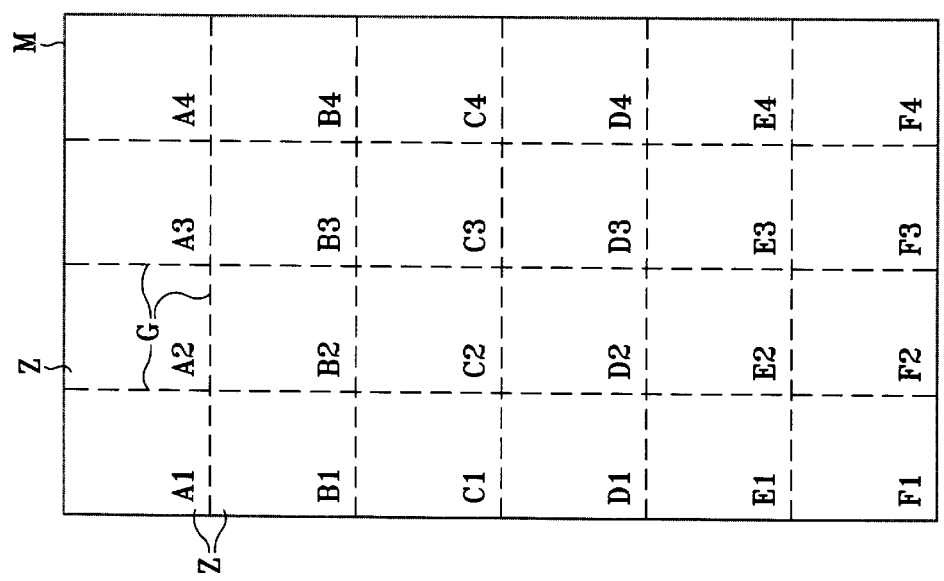
FIG. 3 is a view which depicts a plurality of zones with corresponding identification codes.

Turning now to FIG. 3, a top view is shown which depicts a sheet of media "M," or a digital representation thereof, in accordance with the instant invention. As is seen, the sheet of media "M" can be divided into a plurality of zones "Z" which are delineated by the dashed line grid "G" as shown. Preferably, the zones "Z" form a regular pattern such as a two-dimensional matrix comprising a plurality of rows and a plurality of columns. For example, as depicted in FIG. 3, the zones "Z" can be organized into a matrix comprising four vertical columns and six horizontal rows. It is understood, however, that both the zones "Z" and/or the grid "G" can have any shape and can be organized into any of a number of possible patterns.

As mentioned above, the sheet of media "M" depicted in FIG. 3 as well as the grid "G" can either be an actual sheet of media "M" or a digital representation of a sheet of media. For example, what is depicted in FIG. 3 can be a digital representation of a sheet of media "M" having a grid "G" defined thereon and displayed on a display screen. Alternatively, what is depicted in FIG. 3 can be an actual sheet of media "M" having a grid "G" defined thereon. In the case wherein the media "M" is an actual sheet of media, the media is preferably a transparency or the like which comprises a sheet of transparent plastic media.

As is further seen in FIG. 3, each of the zones "Z" is preferably uniquely identified. That is, preferably, a unique identification code is assigned to each of the zones "Z" so that any zone can be identified by its corresponding unique identification code. For example, a unique alphanumeric code can be used to identify each of the zones "Z" as shown. As an illustrative example, the identification code can employ a first alphabetic character to designate the particular column of a given zone "Z" while a second numeric character can be employed to designate the particular row of the given zone, beginning with the upper left corner of the media "M." Thus, the identification code "B2," for example, would designate a zone "Z" that is in the second column and the second row. It is understood that any of a number of possible identification code schemes can be used and that the specific scheme described herein is intended to be exemplary only.

Figure 4:
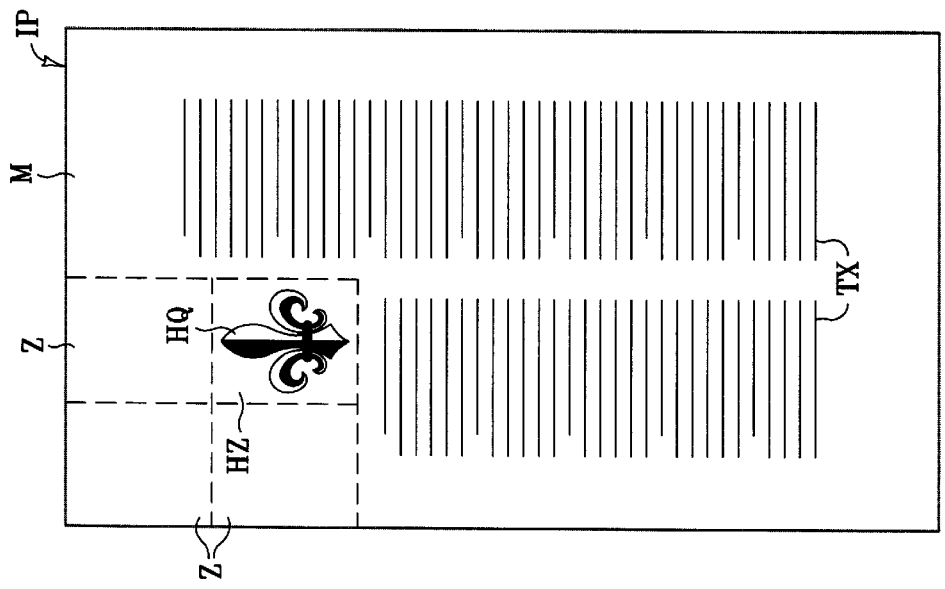
FIG. 4 is a view which depicts an image-product which has a high-quality image located within a high-value zone.

Turning now to FIG. 4, a top view is shown which depicts an example of an image-page "IP" in accordance with the instant invention. The term "image-page" as used herein means at least one multicolor image that is displayed relative to at least a representation of a sheet of media "M" on which the image is to be printed. The image-page "IP" can be produced as a final image by the apparatus 100.

That is, a final image is created when the image-page "IP" is printed onto a sheet of media "M," and therefore, an image-page can be either a digital representation of a final image before the final image is produced, or can be the actual final image after it has been printed onto a sheet of media. Thus, the image page "IP" depicted in FIG. 4 can be either a digital representation of a final image that is displayed on a display screen for example, or an actual final image that has been printed on a sheet of media "M."

The particular image-page "IP" which is depicted in FIG. 4 comprises a sheet of media "M" as well as several images printed thereon. One of the images is a multi-colored "high-quality" image "HQ." The other images on the media "M" are two columns of monochromatic text "TX." An image such as the image "HQ" is deemed a "high-quality" image by the user because the user desires the image to have exceptional sharpness and thus, optimal color plane registration.

That is, the user desires the image "HQ" to have minimal color plane registration irregularities or misalignment. Moreover, in this particular instance, because the other images "TX" are monochromatic, the color plane registration has essentially no relevance except for the high quality image "HQ" since that image is multi-colored. Thus, in other words, in certain instances a user of the apparatus 100 will desire optimization of the color plane registration for a particular image or portion of an image which is located in a particular region of the media "M."

In the particular illustrative example that is depicted by FIG. 4, the high-quality image "HQ" is located in a region of the media "M" which corresponds to a particular zone which is referred to as a high-value zone "HZ." More specifically, the high-quality image "HQ" is located in a region of the media "M" which corresponds to the high-value zone "HZ" which is in the second column and the second row. Thus, the high-quality image "HQ" is coincidentally located in the high-value zone "HZ" which is identified with a code of B2 as discussed above with reference to FIG. 3.

Because the user desires the high-quality image "HQ" to have maximum image quality, the color plane registration should ideally be optimized within the high-value zone "HZ" in which the high-quality image is located. In the instance where the high-quality image "HQ" lies in more than one zone, then only a single zone bearing part of the image need be selected for optimization. However, other means of identification of the high-value zone "HZ" in accordance with the instant invention are discussed below with reference to additional embodiments.

As is now explained with reference to FIGS. 3 and 4, user-defined, localized optimization of the color plane registration can be accomplished in accordance with the apparatus 100. That is, the apparatus 100 is configured to optimize the color plane registration for a particular zone "Z" which is selected by the user. For example, the user first identifies the particular zone "Z" that corresponds to the location of at least a portion of the high-quality image "HQ." In the case of the illustrative example that is depicted in both FIGS. 3 and 4, the zone "Z" that corresponds to the high-quality image "HQ" is the zone B2 because the high-quality image is in the second column and the second row. The identification of the zone "Z" in which the high-quality image "HQ" is located can be accomplished in one of a number of possible ways.

One way to identify the high-value zone "HZ" is by incorporating the zone identification method into a document processing software program or a printer software program. For example, a software program in accordance with an embodiment of the instant invention can be configured to super-impose a grid such as the grid "G" over the images "HQ" and "TX" while the images are in digital form and are displayed on a monitor (not shown) or the like.

The user can then view the images "HQ" and "TX" along with the super-imposed grid "G" while on the monitor screen to determine the location of the high-value zone "HZ." The user can then visually ascertain the identification code which corresponds to the high-value zone "HZ" and can then enter the identification code into the controller 120 by way of the interface device 130 or the like. For example, the controller 130 can cause the display screen 131 to prompt the user to enter the code "B2" into the controller 120 by way of the keypad 132.

Another way of identifying the high-value zone "HZ" is to incorporate a sub-program or the like into a document processing program or a printer software program. The sub-program in accordance with another embodiment of the instant invention can be configured in a manner which will allow the user to identify the high-value zone "HZ" by "clicking" on the high-quality image "HQ" with a computer mouse, or by creating a drag-and-click window which surrounds the high-quality image, or by otherwise digitally identifying the high-quality image employing interaction of a computer mouse or the like with the image while digitally displayed on a monitor screen or the like.

When the high-value zone "HZ" is identified in such a manner, the sub-program can then create a digital "tag" or the like which attaches to the image file and contains data which identifies the high-value zone "HZ" in which the high-quality image "HQ" is located. The "tag" is then automatically read by the controller 120 when the image file is sent to the apparatus 100 for printing, and thus, the identification code is automatically entered into the controller 120.

Yet another way of identifying the high-value zone "HZ" is to print the image-page "IP" on a sheet of media "M." Next, a transparency or the like which bears the grid "G" and corresponding zone identification codes can be overlaid on the media and the printed images. For example, the grid "G" depicted in FIG. 3 can be printed on a sheet of transparent plastic media "M" and then laid on top of the image-page "IP" depicted in FIG. 4. By viewing the transparency with the grid "G" which is overlaid on the media "M," the user can identify the particular zone "Z" in which the high-quality image "HQ" is located. This particular zone "Z" is thus designated as the "high-value zone" "HZ." The identification code that corresponds to the high-value zone "HZ" can then be manually entered into the controller 120 by way of the interface device 130 as in the manner explained above.

Once the high-value zone "HZ" is identified and is known by the controller 120, the apparatus 100 can cause the color plane registration to be optimized for that zone. In other words, corrective adjustments can be made to the various components of the apparatus 100 which will result in optimization of the color plane registration for the high-value zone "HZ." That is, the optimization of the color plane registration in accordance with the instant invention will result in optimum image quality for the high-quality image "HQ." This can be contrasted with the prior art method of optimizing color plane registration in which the average overall color plane registration for an entire sheet of media "M" is optimized. In other words, as explained above, prior art color plane registration optimization results in averaging the irregularities thereof over all images contained on a given sheet of media.

Figure 5:
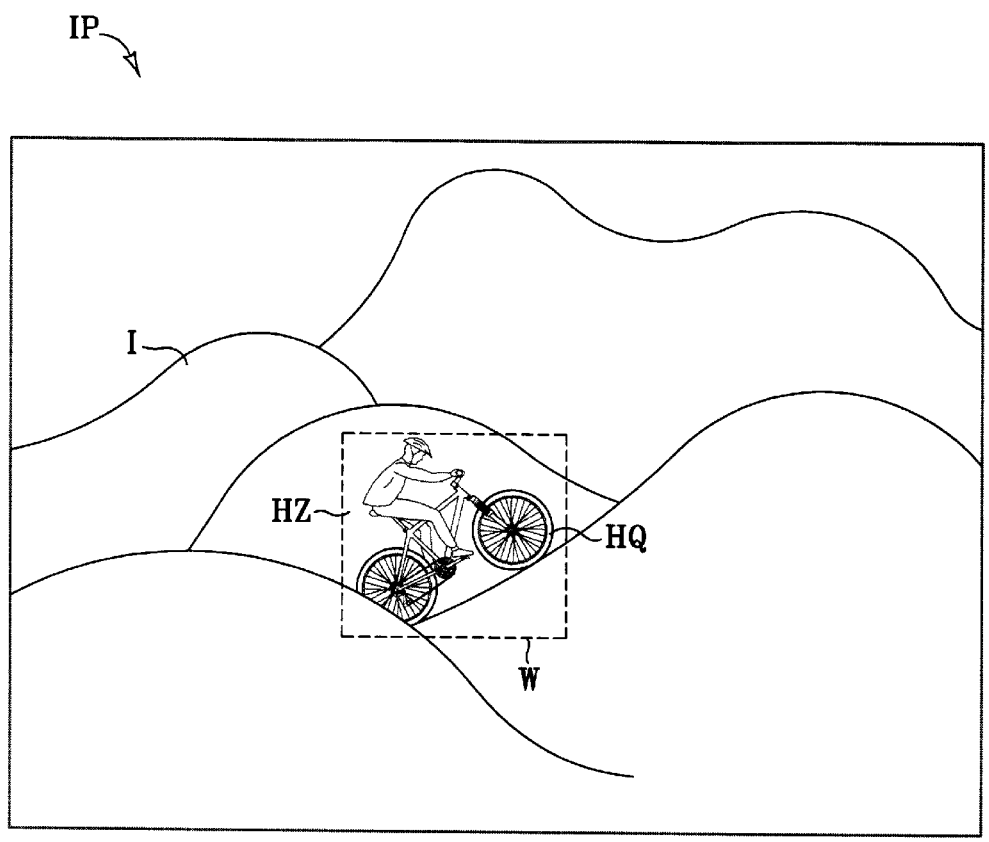
FIG. 5 is a view which depicts an image-product which has a high-quality image located within a high-value zone defined by a window.

Turning now to FIG. 5, a top view is shown which depicts an alternative configuration of an image-page "IP," wherein the image-page comprises a single, large image "I." It is evident from a study of FIG. 5 that, in accordance with the instant invention, the location, size, and shape of the high-value zone "HZ" need not be dependent on any particular pre-defined pattern such as in the illustrative examples discussed above with respect to FIGS. 3 and 4. That is, as shown in FIG. 5, a high-quality image "HQ" can be a portion of a larger image "I." In the particular illustrative example depicted in FIG. 5, the overall image "I" can comprise for example a photograph of a landscape with a bicyclist located in the foreground.

As seen in FIG. 5, the bicyclist can be the high-quality image "HQ" even though it is not physically separated from the remainder of the overall image "I." For illustrative purposes, it is assumed that the image-page "IP" is displayed on a display screen such as the screen of a monitor or the like. It is also assumed that the user wishes to produce a final image in which the bicyclist in the foreground is well defined by optimized color plane registration. The high-value zone "HV" can be selectively defined by a user with regard to its size and location. That is, the user can define the high-value zone "HZ" by creating a drag-and-click window "W" around the bicyclist. The size and location of the window "W" can be selected by the user without regard to any predefined criteria. Thus, the high-value zone "HZ" is defined by the window "W" and the color plane registration will be optimized within the window as otherwise described herein in accordance with the various embodiments of the instant invention.

Figure 6:
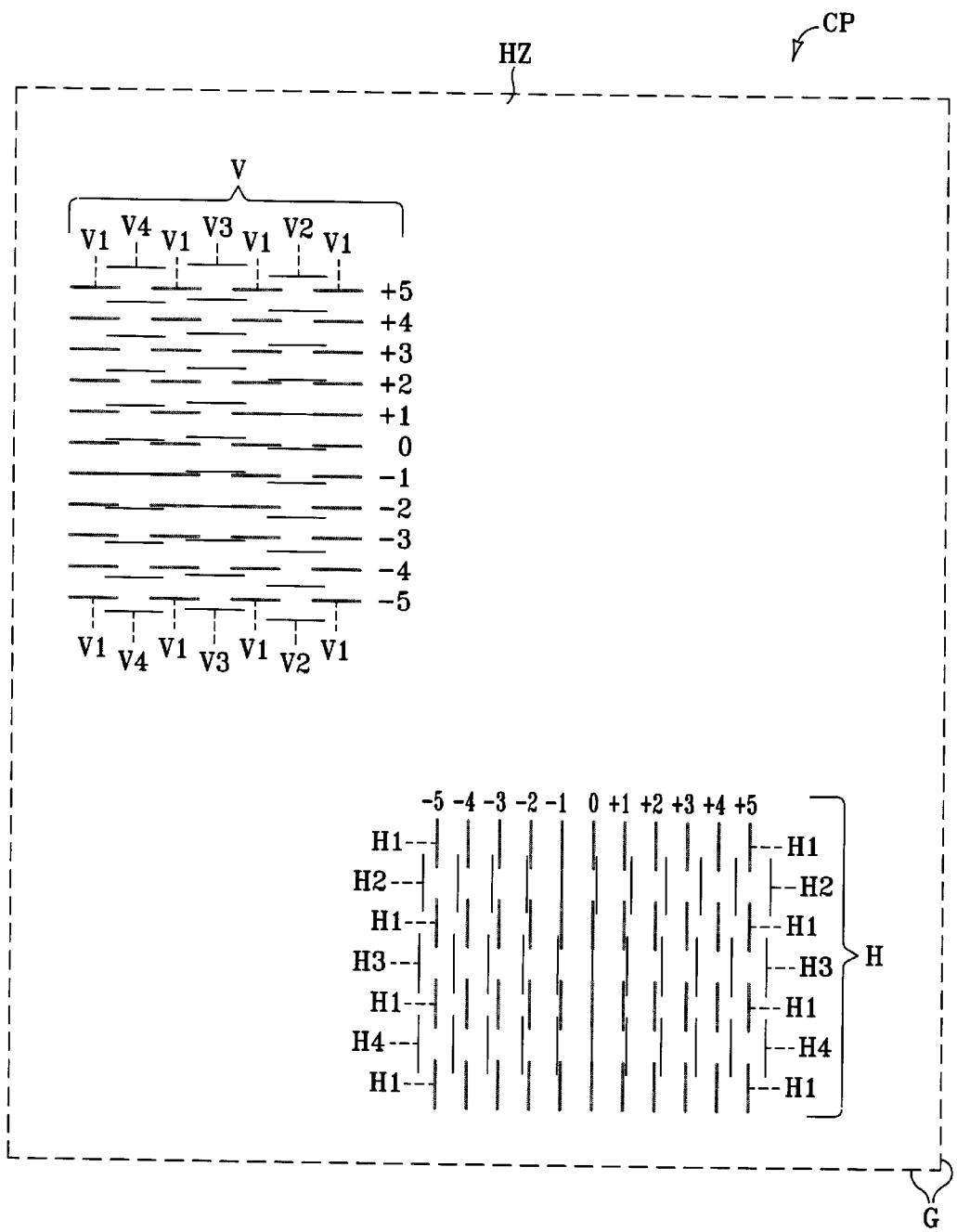
FIG. 6 is a view which depicts a high-value zone with a calibration pattern printed within the zone.

Turning now to FIG. 6, an exemplary calibration pattern "CP" is depicted. In order to optimize the color plane registration in the high-value zone "HZ," the calibration pattern "CP" (or a calibration pattern having an alternative configuration) is printed on a sheet of media "M." The calibration pattern "CP" is printed at a location on the media "M" which will correspond to the high-value zone "HZ" as is seen. That is, the calibration pattern "CP" is printed within the high-value zone "HZ." The calibration pattern "CP" is then evaluated to determine what corrective adjustments (if any) should be made to the apparatus 100 in order to optimize the color plane registration within the high-value zone "HZ."

It is noted that, in order to show sufficient detail of the calibration pattern "CP," an enlargement of the high-value zone "HZ" is shown. That is, in the specific illustrative example, only the high-value zone "HZ" is shown while the remainder of the image-page is not shown. As is seen, the grid "G" defines the high-value zone "HZ." It is understood that, in the alternative, the window "W" (shown in FIG. 5) can define the high-value zone "HZ." Thus, it is further understood that, in the following discussion with reference to FIG. 6, any explanation that refers to the grid "G" is equally applicable with reference to the window "W." That is, the window "W" (shown in FIG. 5) can be substituted in the grid "G" in the following discussion with reference to FIG. 6.

As mentioned above, the calibration pattern "CP" is printed, in accordance with the instant invention, by the apparatus 100 within the high-value zone "HZ." The calibration pattern "CP" can comprise a horizontal calibration portion "H" as well as a vertical calibration portion "V." Each of the portions "H" and "V" can comprise a series of line segments of each of the colors of toner that can be printed by the apparatus 100. Specifically, as depicted in the exemplary calibration pattern "CP," the horizontal portion "H" can comprise four parallel horizontal rows, wherein each row comprises a plurality of parallel, vertical, spaced line segments "H1" of a first color. The first color is preferably black and is represented by a heavy black line.

A single horizontal row of parallel, vertical, spaced line segments "H2" of a second color is also printed as shown. The second color can be, for example, magenta. Likewise, another single horizontal row of parallel, vertical, spaced line segments "H3" of a third color is printed as shown. The third color can be, for example, yellow. Similarly, yet another single horizontal row of parallel, vertical, spaced line segments "H4" of a fourth color is printed as shown. The fourth color can be, for example, cyan. As is evident, a careful examination of FIG. 6 is necessitated by the inability to display colors other than black in the accompanying figures included herewith.

A study of the horizontal portion "H" will reveal that the "black" line segments "H1" are substantially equally spaced in the horizontal direction. Furthermore, the line segments "H1" are spaced apart from one another by a given distance. Each of the other line segments "H2," "H3," and "H4" of the other three colors are also equally spaced from one another, respectively. Furthermore, the "magenta" line segments "H2" are spaced apart from one another by a distance that is the same as the spacing between each of the "yellow" line segments "H3" and the same as the spacing between each of the "cyan" line segments "H4." However, the distance between each of the respective line segments "H2" "H3" and "H4" is greater than the distance between each of the "black" line segments "H1."

In this manner, a horizontal misalignment of any given color plane can be detected by examination of the horizontal portion "H" of the calibration pattern "CP." More specifically, the exemplary calibration pattern "CP" employs the black color plane as a reference against which alignment of the other color planes of magenta, yellow, and cyan can be measured. That is, the alignment of each of the magenta, the yellow, and the cyan color planes is measured relative to the black color plane by the calibration pattern "CP." More specifically, a substantially perfect alignment of all four color planes in the horizontal direction will result in all four line segments "H1," "H2," "H3," and "H4" appearing to be collinear with one another at the position marked "0" on the horizontal portion "H."

As is revealed by a close examination of FIG. 6, however, all of the line segments except the respective "magenta" line segment "H2" are collinear at the position marked "0." This indicates that all the color planes except the magenta color plane are horizontally aligned with one another. Further examination of FIG. 6 reveals that one of the "magenta" line segments "H2" is collinear with the black line segments "H1" at the position marked "–1." This indicates that the magenta color plane should be adjusted by the amount of "minus one" (–1) units in order to bring it into alignment with the other color planes.

As is further seen in FIG. 6, the vertical portion "V" of the calibration pattern "CP" is configured in a manner similar to that of the horizontal portion "H" except that the vertical portion has an orientation that is preferably 90 degrees of rotation from the horizontal portion. However, it is understood that the angular orientation of the vertical portion "V" with respect to the horizontal portion "H" can be other than 90 degrees of rotation and is most preferably dictated by the angular orientation of the scan direction relative to the process direction. The "process direction" is the direction of movement of the surface of the respective photoconductor 11, while the "scan direction" is the direction that the laser device 13 scans across the surface of the photoconductor relative thereto. In many cases, the relative difference in angular orientation between the scan direction and the process direction is substantially 90 degrees. However, as mentioned above, this difference can be other than 90 degrees.

The vertical portion "V" is thus configured to detect and measure misalignment of any of the color planes in the vertical direction which can be associated with the process direction. Similarly, the horizontal portion "H" and horizontal direction can be associated with the scan direction. As is further seen, the vertical portion "V" comprises four vertical columns of parallel, spaced, horizontal "black" line segments "V1." Similarly, the vertical portion "V" includes a single vertical column of parallel, spaced, horizontal line segments "V2" which are preferably magenta. Likewise, "yellow" line segments "V3" and "cyan" line segments "V4" are also included.

Misalignment of any of the color planes in the vertical direction is detected and measured in the manner described above with respect to detection and measurement of horizontal misalignment. For example, as a close examination of FIG. 6 reveals, none of the line segments "V1," "V2," "V3," and "V4" are collinear at the position "+0" on the vertical portion "V." This indicates that all of the color planes are misaligned with respect to one another in the vertical direction.

A further examination of FIG. 6 reveals that one of the "magenta" line segments "V2" is collinear with one of the "black" line segments "V1" at the location marked "+1." Similarly, it is seen that one of the "yellow" line segments "V3" is collinear with one of the "black" line segments "V1" at the position marked "−2." It is also seen that one of the "cyan" line segments "V4" is collinear with one of the "black" line segments "V1" at the position marked "−1." Thus, in order to achieve substantial alignment of all four color planes within the high-value zone "HZ," the following corrective adjustments are preferably made: the magenta color plane is to be moved in the horizontal direction by the amount of minus one (−1) units; the magenta color plane is to be moved in the vertical direction by the amount of plus one (+1) units; the yellow color plane is to be moved in the vertical direction by the amount of minus two (−2) units; and the cyan color plane is to be moved in the vertical direction by the amount of minus one (−1) units. These corrective adjustment values can then be manually entered into the controller 120 by way of the interface device 130, or entered automatically via a calibration program.

As is evident from the above discussion, the degree of misalignment of the color planes relative to one another within a user-defined high-value zone "HZ" can be ascertained by visual examination of the printed calibration pattern "CP." The corrective adjustment values can then be manually entered into the controller 120. It is understood that the exemplary calibration pattern "CP" which is depicted in FIG. 6 is but one of a number of possible configurations of the calibration pattern in accordance with the instant invention. It is further understood that the calibration pattern "CP" need not be examined visually by the user, nor do the corrective adjustment values need to be manually entered into the controller 120. Alternatively, the calibration pattern "CP," or an alternative variation thereof, can be examined automatically by way of the sensor 21 and the controller 120 (shown in FIG. 2) as well as other components as will be discussed below.

Turning back now to FIG. 2, the apparatus 100, in accordance with one embodiment of the instant invention, can include a repositioning device 125 as mentioned above. The repositioning device 125 is configured to laterally reposition the sensor 21 as directed by the controller 120. During operation, the user can select or define, as explained above, the high-value zone "HZ" (shown in FIGS. 4 and 5). The high-value zone "HZ" preferably contains a high-quality image "HQ" that the user wishes to print. As explained above, the high-quality image "HQ" can be wholly contained within the high-value zone "HZ." Alternatively, the high-quality image "HQ" can be a given portion of an overall image, wherein the high-value zone "HZ" is defined to surround the given portion. The high-value zone "HZ" is identified so as to be recognizable by the controller 120. For example, referring to FIGS. 3 and 4, the identification code (B2) of the user-selected zone "Z" which corresponds to the location of the high-quality image "HQ" is then entered into the controller 120 such as by any of the means described above, including automatic or manual means.

The controller 120 can then cause a calibration pattern "CP" (shown in FIG. 6) to be printed on a sheet of media "M." Alternatively, the calibration pattern "CP" can be produced on an object other than a sheet of media "M" such as an intermediate transfer device (not shown) that can be alternatively included in an imaging device in accordance with the instant invention as discussed above. The controller 120 then preferably causes the repositioning device 125 to position the sensor 21 relative to the print path "PP" (or an intermediate transfer device, as the case may be) so that, as the media "M" moves along the print path "PP" (or intermediate transfer device) and passes the sensor, the calibration pattern "CP" can be scanned by the sensor.

That is, the controller 120 can cause the repositioning device 125 to position the sensor 21 so that the calibration pattern "CP" will pass beneath the sensor, wherein the sensor can detect and gather data representative of the color plane registration within a specific user-defined zone "Z." The data is transmitted by way of a signal to the controller 120, and the controller evaluates the data to determine the extent of any color plane misalignment, and any corrective action to be taken in the event of color plan misalignment.

In accordance with an alternative embodiment of the instant invention, the repositioning device 125 is omitted and the apparatus 100 includes a plurality of sensors 21 which are arranged in a pattern which extends laterally across the print path "PP" (or across the width of an intermediate transfer device (not shown). In this manner, the sensors 21 can detect and gather data representative of the color plane registration by scanning a calibration pattern "CP" that is anywhere on the media "M" (or intermediate transfer device). The respective sensor 21 scans the calibration pattern "CP," then gathers and sends data indicative of the nature and extent of any color plane misalignment revealed by the calibration pattern to the controller 120 in the form of a signal as in manner discussed above.

Thus, whether the nature and extent of the color plane misalignment is ascertained by evaluation of the calibration pattern "CP" and entered manually or automatically into the controller 120, the computer executable steps 122 can be configured to cause the controller to make corrective adjustments to the various relevant components ("print engine") of the apparatus 100 in order to optimize the color plane registration at the location of the high-value zone "HZ."

That is, based on the location of the high-value zone "HZ," which is known, and based on the extend and nature of any irregularities in the color plane registration within the high-value zone, which are known, the computer executable steps 122 can determine the nature and extent of any corrective adjustments that need to be made to the print engine of the apparatus 100 in order to "focus" the color plane registration at the high-value zone "HZ."

After the calibration pattern "CP" is produced and after corrective adjustments, if any, to the print engine are carried out, both as described above, the calibration pattern can alternatively be printed a second time in order to double-check the effectiveness of the corrective adjustments to the print engine. This is an optional step that can be performed routinely or at given intervals. When the color planes have been "focused" within the user-defined high-value zone "HZ," the final image-product which contains the high-quality image "HQ" can be produced.

Figure 7:
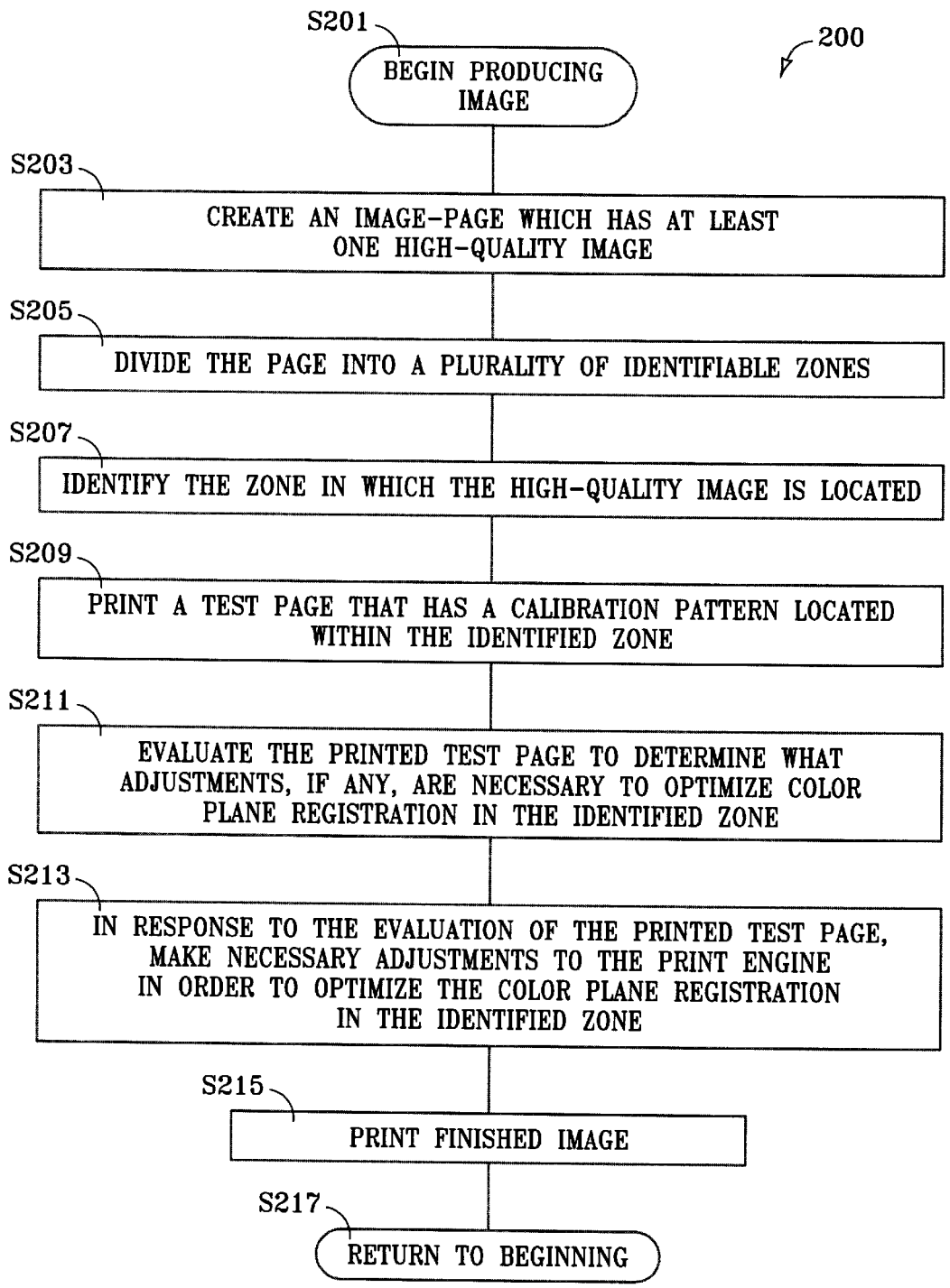
FIG. 7 is a flow diagram which depicts several steps in a process for optimizing color plane registration in accordance with the instant invention.

Moving now to FIG. 7, a flow diagram 200 is shown which depicts various steps of a process for printing a finished image with localized color plane registration optimization in accordance with the instant invention. The process represented by the flow diagram 200 can be carried out in conjunction with the apparatus 100 which is described above with reference to the accompanying FIGS. 2 through 6.

As is seen in FIG. 7, the production of a finished image begins with the step S201. Moving to step S203, an image-page is created which has at least one high-quality image. The step of creating an image-page does not require that an actual image-page be produced on a sheet of media. That is, an image-page can be created and stored digitally in accordance with step S203 without being actually printed. Alternatively, the image-page can also be printed on a sheet of media or the like in accordance with the flow diagram 200.

In accordance with step S205, the image-page is divided into a plurality of identifiable zones. This step can also be performed digitally such as within a computer processor or the like. Alternatively, this step can be performed manually, for example, by laying a clear transparency having a grid pattern defined thereon over a printed image-page.

Moving to step S207, a particular zone is identified by the user as a high-value zone, wherein the particular zone corresponds to the location of the high-quality image on the image-page. This step can be accomplished either manually by visually identifying the particular zone with the aid of a transparent grid overlay for example, or automatically by "clicking" on the high-quality image with the aid of a computer mouse, or otherwise identifying the high-value zone with the aid of a mouse and a monitor or the like as described above with respect to the apparatus 100.

In accordance with the step S209, a test page is printed which bears a calibration pattern that is located within the particular zone ("high-value zone") which was located in accordance with step S207. Moving to step S211, the calibration pattern is evaluated to determine what corrective adjustments, if any, are required to be made in order to optimize the color plane registration of the high-value zone. Step S211 can be performed manually by the user in which case the user visually inspects the calibration pattern to determine the extent and nature of misaligned color planes. Alternatively, this step can be performed automatically by the controller with the aid of a sensor that is capable of scanning the calibration image.

The following step of S213 dictates that any necessary corrective adjustments are made to the print engine (which is used to generate the image on the media) in response to the results of the evaluation of the calibration pattern which was performed in accordance with the previous step S211. The step S213 preferably results in "focusing" of the color plane registration within the particular zone in which the high-value image is to be printed.

That is, the step S213 preferably results in optimization of the color plane registration in the high-value zone which was defined and identified in accordance with the previous step of S207. Once the color plane registration is optimized in accordance with step S213, the process progresses to step S215 in accordance with which a finished image is produced on a sheet of media. Moving to step S217, the flow diagram 200 can return to the beginning step of S201, whereupon the process is repeated.

It is understood that the flow diagram 200 of FIG. 7 is exemplary only, and that different or additional steps can be used to implement the methods of the present invention. The steps of the flow diagram 200 can be reduced to a set of computer executable steps in the form of a program, which can then be executed by the processor 120 of FIG. 2, for example, to implement the methods of the present invention.

In accordance with yet another embodiment of the instant invention, a method of optimizing color plane registration includes the step of focusing the color plane registration on a high-value image. That is, the color plane registration is optimized within a given region of an image-product so that misalignment of the color planes is minimized for the region occupied by the high-value image.

In other words, a method of optimizing color plane registration includes locally minimizing color plane misalignment in a selectively defined zone of an image-page, wherein the selectively defined zone corresponds to the location of a high-quality image. The selectively defined zone can be referred to as a "high-value zone" since the image quality within the zone is to be optimized. In order to locally minimize the color plane misalignment within the high-value zone, the location of the high-value zone is determined relative to the image-page.

In accordance with another embodiment of the instant invention, a method of producing an image includes creating an image-page that has at least one high-quality image. The image-page can be created, for example, by way of a software program such as a document processing program that is configured to support graphics, or by way of a drafting program or the like. Examples of document processing programs include word processing programs (such as Word, available from Microsoft Corporation of Redmond, Wash.), presentation programs (such as PowerPoint®), also available from Microsoft Corp.), spreadsheet programs (such as Excel, also available from Microsoft Corp.), and image processing programs (such as Acrobat®), available from Adobe Systems inc.) An example of a drafting program is AutoCAD®), available from Autodesk, Inc. The image-page is displayed so that it can be visually examined by the user. Visually displaying the image-page can include providing a display screen, such as a monitor or the like, and displaying the image-page on the display screen. Visually displaying the image-page can include printing the image-page onto a sheet of media so as to produce an image-product.

A plurality of zones can be defined on the image-page in accordance with the method. This can be accomplished in any of a number of ways depending on how the image-page is displayed. For example, if the image-page is displayed by printing it onto a sheet of media in order to produce a finished image, then the plurality of zones can be defined on the finished image by providing a transparency having a grid defined thereon, wherein the grid defines the plurality of zones. The transparency also preferably has a unique identification code displayed within each zone.

The transparency can then be overlaid on top of the finished image so that the grid, and thus the plurality of zones, is super-imposed on the finished image. Thus, a user can visually examine the transparency and the printed finished image to locate a given zone (high-value zone) in which the high-quality product is predominantly located. The user can then ascertain the identification code for the given zone. The identification code can then be entered by the user into a controller or the like for use in focusing the color planes in the high-value zone.

In the alternative, if the image-page is displayed on a monitor screen, for example, a grid or the like can be generated digitally within the software program used to create the image-page. The grid can be super-imposed on the image-page by the software program so that the grid defines the plurality of zones on the image-page. Each zone defined by the grid preferably is uniquely identified by way of a code or symbol that is displayed in the respective zone.

A further alternative means of defining a plurality of zones on the image-page in the case wherein the image-page is displayed on a display screen is to directly identify the high-quality image which then results in automatically defining the zone in which the high-quality image is located. In other words, the high-value zone can be identified by "clicking" on the high-quality image using a computer mouse or the like. The procedure of using a computer mouse to "click" on an image or the like is widely utilized in prior art software and comprises using the computer mouse to move a cursor so that the cursor is "on" the object to be clicked.

When the cursor is on the object to be clicked, the user presses a button on the computer mouse to "click" the object. The software program recognizes this click and performs various operations in response to the clicking of the object in which the clicked object holds special significance. With regard to the instant invention, the act of "clicking" on a high-value image can serve to identify the clicked image as a high-value image and thus to identify, or select, the given zone of the image-page in which the high-value image is located.

Recalling the above scenario in which a grid is displayed on the display screen along with the image-page, the computer mouse can also be employed to identify the high-value zone by "clicking" within the high-value zone using the mouse. That is, the user can visually identify a particular zone in which the high-quality image is predominantly located. The user can then use the computer mouse to click anywhere in the particular zone so as to identify the particular zone as the high-value zone.

Likewise, and with similar effect, a "window" can be created around the high-value image using a computer mouse. This procedure of creating a window is also widely employed in prior art software applications. Such a window is typically created by placing the cursor in a location which is to correspond to one corner of the window. The mouse button is pressed to mark this location. While the button is still pressed, the mouse is then moved toward a second location which corresponds to the diagonal corner of the window.

When the second location is reached, the button is then released to create the window. Other methods of creating a window can be employed. The window thus created on the display screen and which surrounds the high-quality image is used to define and identify the high-value zone. Thus, in the case wherein the image-page is displayed on a display screen such as a monitor screen, a grid need not be generated nor displayed. For example, a drag-and-click window or the like can be created by the user as described immediately above, wherein the user is prompted to create a drag-and-click window to represent the high-value zone.

The window can then be created to define the high-value zone as explained above with reference to FIG. 5. Once the high-value zone is defined by the drag-and-click window, the relevant program can develop a location of the high-value zone and send the location to the controller automatically. That is, the user would not be required to enter the location of the high-value zone into the controller. Thus, any one of several alternative means of defining and identifying the high-value zone can be employed in accordance with the instant invention.

In addition to defining and identifying the high-value zone, the method also includes the step of optimizing the color plane registration for the high-value zone. The optimization of the color plane registration for the high-value zone will preferably focus the color plane alignment within the high-value zone so that any image within the high-value zone is printed with heightened color plane registration. Optimization of the color plane registration for the high-value zone can include such steps as determining what corrective adjustments (if any) are required in order to focus the color planes within the high-value zone.

For example, corrective adjustments can be made directly to the print engine, or they can be made to computer-executable steps that are configured to operate the respective imaging device. (The term "print engine" means those collective physical components (such as lasers, optics, photoconductors, any intermediate transfer media, and drive mechanisms that are used to generate an image on a sheet of media using an imaging device.) The corrective adjustments can ultimately result in changes to the timing and/or movement of the related laser devices and/or photoconductors, among other devices, in order to focus the color planes in the given zone.

The determination of what, if any, corrective adjustments are required can begin with the printing of a calibration pattern within the high-value zone. The calibration pattern can have any of a number of possible configurations, but is ultimately intended to facilitate ascertainment of the state of the color plane registration within the user-defined or user-selected high-value zone as well as the extent and nature of the corrective adjustments required to focus the color planes. After the calibration pattern is printed, it is evaluated in order to determine the nature and extend of any color plane misalignment within the high-value zone. The user can perform this visually.

Alternatively, a sensor can be provided, wherein the sensor is configured to scan the calibration pattern after it is printed. A controller can be provided as well, as explained above, wherein the sensor sends data to the controller, wherein the data is indicative of the relevant features of the calibration pattern. The controller can preferably automatically evaluate the data, and thus the calibration pattern, as a result of the sensor scanning the pattern.

It is also understood that the calibration pattern can be formed on an intermediate transfer medium ("ITM"), such as a drum or a belt, within the imaging apparatus. Thus, the procedure of printing the calibration pattern on a sheet of media can be replaced with similar effect with the process of producing the calibration pattern on the ITM without the need to transfer the image to printable media such as paper or the like.

Corrective adjustment can then be made to the print engine as a result of the evaluation of the calibration pattern. Such corrective adjustments can be made as the result of the user manually entering data which was gleaned from the visual examination of the calibration pattern and which is manually entered into the controller by the user with the aid of an interface device such as a keyboard or the like. Alternatively, the corrective adjustments can be made automatically by the controller in response to automatically evaluating the data which relates to the calibration pattern and which is sent to the controller from the sensor. After the corrective adjustments are made, the finished image can be printed and thus produced.

While the above invention has been described in language more or less specific as to structural and methodical features, it is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A method of optimizing color plane registration for a multi-color imaging device configured to print an image-page on a sheet of media, the method comprising:

identifying a high-value zone on the image-page, wherein the high-value zone is smaller than the image-page; and, focusing the color plane registration within the high-value zone.

2. The method of claim 1, and wherein the high-value zone is identified by creating a window on the image-page, wherein the high-value zone is defined by the window.

3. The method of claim 1, and further comprising defining a plurality of zones on the image-page, wherein the high-value zone is identified by selecting one of the plurality of zones as the high-value zone.

4. A method of producing an image, comprising:

creating an image-page which has at least one image;

displaying the image-page;

identifying a high-value zone on the image-page; and, optimizing the color plane registration for the high-value zone.

5. The method of claim 4, and wherein the image-page is displayed by printing the image-page on a sheet of media.

6. The method of claim 5, and further comprising:

providing a transparency which has a plurality of zones defined thereon;

overlaying the transparency on the printed image-page;

visually examining the transparency and printed image page; and, selecting one of the plurality of zones as the high-value zone.

7. The method of claim 6, and further comprising:

providing a unique identification code for each of the plurality of zones; and, ascertaining the identification code for the high-value zone.

8. The method of claim 4, and further comprising providing a display screen, wherein the image-page is displayed on the display screen.

9. The method of claim 8, and further comprising:

defining a plurality of zones on the display screen;

super-imposing the plurality of zones over the image-page;

selecting one of the plurality of zones as the high-value zone.

10. The method of claim 9, and wherein the high-value zone is selected by clicking on one of the plurality of zones using a computer mouse.

11. The method of claim 8, and wherein the high-value zone is identified by creating a window on the image-page.

12. The method of claim 4, and further comprising printing a calibration pattern within the high-value zone.

13. The method of claim 12, and further comprising evaluating the calibration pattern for indications of color plane misalignment.

14. The method of claim 13, and wherein the calibration pattern is evaluated visually by the user.

15. The method of claim 13, and further comprising:

providing a sensor, wherein the calibration pattern is scanned by the sensor; and, providing a controller, wherein the calibration pattern is evaluated automatically by the controller as a result of scanning the calibration pattern by the sensor.

16. The method of claim 13, and further comprising:

making corrective adjustments to a print engine as a result of evaluating the calibration pattern; and, printing a finished image.

17. An imaging apparatus, comprising:

a print path configured to convey there along a sheet of media;

a plurality of photoconductors oriented relative to the print path, wherein the photoconductors are configured to each provide a respective color plane to be deposited onto the sheet of media to print an image-page on a sheet of media a print engine that is configured to generate a respective latent color plane on each of the photoconductors;

a controller linked in signal communication with the print engine, wherein the controller is configured to focus the color plane registration within a user-defined high-value zone.

18. The imaging apparatus of claim 17, and wherein the imaging apparatus is configured to print a calibration pattern in the high-value zone.

19. The imaging apparatus of claim 18, and further comprising a sensor linked in signal communication with the controller, wherein the sensor is configured to scan the calibration pattern for irregularities in color plane registration.

20. The imaging apparatus of claim 19, and further comprising a repositioning device configured to support the sensor, and further configured to selectively position the scanner substantially laterally relative to the print path in accordance with the location of the calibration pattern.

* * * * *